UNITED STATES PATENT OFFICE.

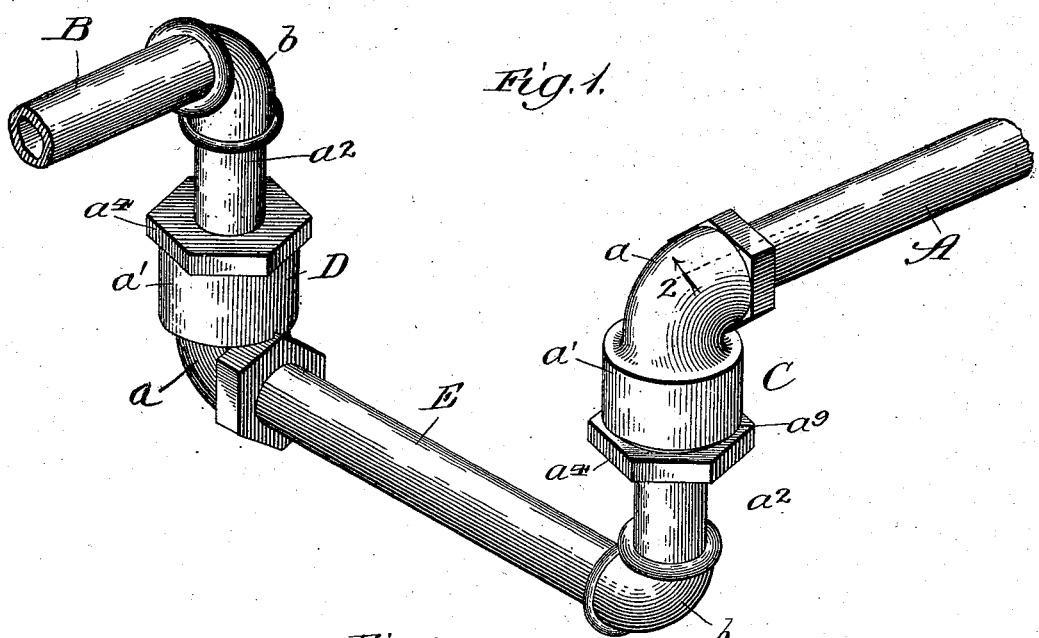
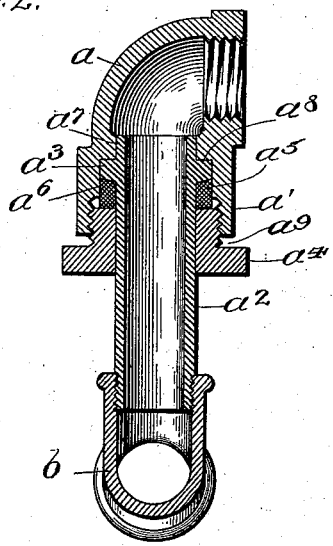

JOSEPH E. FORSYTH, OF CHICAGO, ILLINOIS.

PIPE-COUPLING.

SPECIFICATION forming part of Letters Patent No. 692,651, dated February 4, 1902.

Application filed March 23, 1901. Serial No. 52,590. (No model.)

*To all whom it may concern:*

Be it known that I, JOSEPH E. FORSYTH, a citizen of the United States, residing at Chicago, in the county of Cook and State of Illinois, have invented a new and useful Pipe-Coupling, of which the following is a specification.

My invention relates particularly to pipe-couplings for use on train-pipes; and my primary object is to provide an improved elbow having a rotatable or swiveled pipe-section connected therewith, the same being peculiarly applicable to use on train-pipes near the point of connection between the train-pipes of different cars.

My invention is shown in its preferred form in the accompanying drawings, in which—

Figure 1 is a perspective view showing two of the improved elbow-couplings applied to one end of the train-pipe of a car; and Fig. 2, a broken section taken, as indicated, at line 2 of Fig. 1.

A represents one section of a train-pipe; B, another section thereof; C and D, elbow-couplings of my improved construction, and E a pipe-section connecting said elbow-couplings.

Each elbow-coupling comprises, preferably, a short elbow $a$, having one enlarged end $a'$, a pipe-section $a^2$, extending into the enlarged end $a'$ and provided with an external rigid collar or shoulder $a^3$, an externally-threaded nut $a^4$, connected with an internal thread at the adjacent enlarged end $a'$, and a yielding packing-ring $a^5$, confined between the nut $a^4$ and the shoulder $a^3$. For accomplishing the purpose to which the coupling is here put I prefer to equip the free end of the pipe-section $a^2$ with an elbow $b$. The cylindrical surface of the packing-ring $a^5$ contacts with an inner cylindrical surface $a^6$, adjacent to and preferably of smaller diameter than the internally-threaded portion of the end $a'$. The shoulder of the collar $a^3$ adjacent to the packing-ring is preferably sloping or beveled, as shown. The interior extremity of the section $a^2$ is preferably of substantially the same diameter as the body of said section and fits within an inner cylindrical surface $a^7$, adjacent to which is a shoulder $a^8$ for engaging the collar $a^3$. A space $a^9$ is preserved between the wrench-engaging portion of the nut and the adjacent surface of the end $a'$ of the elbow $a$. It will thus be seen that the nut $a^4$ may be caused to compress the packing-ring $a^5$ and that the nut is adjustable for wear. It will also be seen that the pipe-section $a^2$ is swiveled in the adjacent end of the elbow $a$, a steam or air tight joint being preserved, nevertheless.

The pipe-section A may be regarded as substantially the end portion of the train-pipe with which any car is equipped, and the pipe-section B may be equipped with any suitable coupling members for coupling with the train-pipe of another car. In one construction employed by me the pipe-section B is equipped with an automatic coupling, and a similar coupling member is employed on a similar pipe-section, with which the other car is equipped. Assuming the pipe-section A to lie substantially horizontal and parallel to the side of the car, but at a distance from the center of the car, and the connecting-section E to lie in substantially a horizontal plane and to extend transversely of the car, it is obvious that the section E has swivel connection with both the pipes A and B. The section A is ordinarily incapable of longitudinal movement, but is allowed some lateral movement, and the section B, which may be supported from the draw-bar of the car, is allowed a longitudinal movement to permit yielding when two cars come together. It will be observed that in the construction shown the parts of the couplings C and D are reversed, whereby the section E is caused to lie in a lower plane than the sections A and B. This enables floor-beams or other obstructions to be passed.

It is not absolutely essential that the portion of the pipe-section A which is attached to the elbow $a$ shall lie exactly in a horizontal plane. Moreover, it will be understood that the elbows may be so disposed that the pipe-section E shall swing in a vertical instead of a horizontal plane.

The manner of use of the invention has practically been explained in the foregoing description and will readily be understood by those skilled in the art.

What I claim as new, and desire to secure by Letters Patent, is—

1. The combination with a pipe-section having an enlarged end provided internally with a shoulder and adjacent to said shoulder with a smooth cylindrical surface and adjacent thereto with internal threads, a pipe-section extending into said enlarged end and provided with a rigid collar engaging said shoulder, a packing-ring engaging said collar and an externally-threaded annular nut through which said last-named pipe-section extends and which serves to compress said packing-ring against said collar, substantially as described.

2. The combination with an elbow provided with an enlarged end having an internal shoulder and adjacent thereto a smooth cylindrical surface, said enlarged end being internally threaded adjacent to said cylindrical surface, a pipe-section extending into said enlarged end and provided near its inner end with a rigid collar engaging said shoulder, a packing-ring adjacent to said collar, and an externally-threaded annular nut receiving the pipe-section and serving to compress said packing-ring between itself and the collar, substantially as and for the purpose set forth.

3. The combination with a pipe-section A, of an elbow connected therewith and provided with an enlarged end having an internal shoulder and a cylindrical surface adjacent to said shoulder, a pipe-section extending into said enlarged end and provided with a rigid collar engaging said shoulder, a packing-ring adjacent to said collar, an annular nut receiving said pipe-section and connected with said enlarged end and serving to compress said packing-ring between itself and said collar, and an elbow $b$ connected with the free end of said pipe-section, substantially as and for the purpose set forth.

JOSEPH E. FORSYTH.

In presence of—
D. W. LEE,
ALBERT D. BACCI.